United States Patent
Bostick et al.

(10) Patent No.: US 10,380,207 B2
(45) Date of Patent: Aug. 13, 2019

(54) ORDERING SEARCH RESULTS BASED ON A KNOWLEDGE LEVEL OF A USER PERFORMING THE SEARCH

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 14/937,253

(22) Filed: Nov. 10, 2015

(65) Prior Publication Data
US 2017/0132227 A1    May 11, 2017

(51) Int. Cl.
G06F 16/00 (2019.01)
G06F 16/9535 (2019.01)
G06F 17/00 (2019.01)

(52) U.S. Cl.
CPC ................. *G06F 16/9535* (2019.01)

(58) Field of Classification Search
None
See application file for complete search history.

(56) References Cited

U.S. PATENT DOCUMENTS

| | | | |
|---|---|---|---|
| 6,006,218 A | 12/1999 | Breese et al. | |
| 6,526,440 B1 | 2/2003 | Bharat | |
| 7,836,050 B2 | 11/2010 | Jing et al. | |
| 8,515,816 B2 | 8/2013 | King et al. | |
| 8,788,517 B2 | 7/2014 | Horvitz et al. | |
| 2006/0282413 A1* | 12/2006 | Bondi | G06F 17/30991 |
| 2007/0299826 A1* | 12/2007 | Wang | G06F 17/30613 |
| 2009/0063965 A1 | 3/2009 | Lee | |
| 2009/0248510 A1* | 10/2009 | Ahluwalia | G06F 17/3064 |
| | | | 705/14.54 |
| 2010/0088331 A1* | 4/2010 | White | G06F 17/30867 |
| | | | 707/759 |
| 2011/0270826 A1 | 11/2011 | Cha et al. | |

(Continued)

OTHER PUBLICATIONS

Madhani et al., "End-to-End Severless, Mobile-Only Based Document Processing", ip.com, Jun. 5, 2013; 7 Pages.

(Continued)

*Primary Examiner* — Usmaan Saeed
*Assistant Examiner* — Yu Zhao
(74) *Attorney, Agent, or Firm* — Jay Wahlquist; Andrew D. Wright; Roberts Mlotkowski Safran Cole & Calderon, P.C.

(57) ABSTRACT

Systems and methods for ranking search results according to a knowledge level of a user. A computer-implemented method includes: receiving, by a computing device, a search query from a user via a user computer device; determining, by the computing device, a plurality of results based on the search query; determining, by the computing device, a respective expertise level for each of the plurality of results; ranking, by the computing device, the plurality of results based on a knowledge level of the user and the respective expertise level for each of the plurality of results; and outputting, by the computing device, the ranked plurality of results to the user computer device.

17 Claims, 4 Drawing Sheets

(56) References Cited

U.S. PATENT DOCUMENTS

| | | | | |
|---|---|---|---|---|
| 2012/0041940 A1* | 2/2012 | Schachter | ......... | G06F 17/30873 |
| | | | | 707/709 |
| 2013/0110641 A1* | 5/2013 | Ormont | ................. | G06Q 50/01 |
| | | | | 705/14.66 |
| 2013/0325779 A1* | 12/2013 | Shahshahani | ............ | G06N 5/02 |
| | | | | 706/46 |
| 2014/0280214 A1* | 9/2014 | Han | ................. | G06F 17/30943 |
| | | | | 707/748 |

OTHER PUBLICATIONS

Anonymous, "Detection and Reaction to Contextual Information Based on Analysis of a Live Data Stream", ip.com, Jun. 22, 2010; 5 Pages.

* cited by examiner

ORDERING SEARCH RESULTS BASED ON A KNOWLEDGE LEVEL OF A USER PERFORMING THE SEARCH

BACKGROUND

The present invention relates generally to computer-based searching and, more particularly, to methods and systems for ordering search results based on a knowledge level of a user performing the search.

Search engines have become the dominant way to access information on the Internet, providing ease of use and accurate results. Typically, search results generated from a search engine comprise a list of URLs (Uniform Resource Locator) of web sites. For example, when a search query is run through a search engine, a user enters some keywords and the search engine returns a list of documents (web sites, PDFs, etc.) as search results. The results are often ranked by determined relevancy, e.g., according to a scoring algorithm of the search engine, and listed in order according to the ranking so that the user is not overwhelmed with the task of having to skim through a myriad of possibly irrelevant matches. However, a user may not be interested in some search results, even those that are scored as highly relevant to the search query, when the search results are within the knowledge level of the user.

SUMMARY

In an aspect of the invention, a computer-implemented method includes: receiving, by a computing device, a search query from a user via a user computer device; determining, by the computing device, a plurality of results based on the search query; determining, by the computing device, a respective expertise level for each of the plurality of results; ranking, by the computing device, the plurality of results based on a knowledge level of the user and the respective expertise level for each of the plurality of results; and outputting, by the computing device, the ranked plurality of results to the user computer device.

In another aspect of the invention, there is a computer program product for ranking search results according to a knowledge level of a user. The computer program product includes a computer readable storage medium having program instructions embodied therewith. The program instructions are executable by a computing device to cause the computing device to: receive a search query from a user via a user computer device; determine a plurality of web pages based on the search query; determine a respective expertise level for each of the plurality of web pages; rank the plurality of web pages based on a knowledge level of the user and the respective expertise level for each of the plurality of web pages, wherein the knowledge level of the user is determined from activity of the user from a previous search query for a same topic as the search query; and output the ranked plurality of web pages to the user computer device.

In another aspect of the invention, there is a system for ranking search results according to a knowledge level of a user. The system includes a CPU, a computer readable memory and a computer readable storage medium associated with a computing device. The system includes: program instructions to receive a search query from a user via a user computer device; program instructions to determine a plurality of web pages based on the search query; program instructions to determine a respective expertise level for each of the plurality of web pages; program instructions to rank the plurality of web pages based on a knowledge level of the user and the respective expertise level for each of the plurality of web pages; and program instructions to output the ranked plurality of web pages to the user computer device. The program instructions are stored on the computer readable storage medium for execution by the CPU via the computer readable memory. The knowledge level of the user is determined from activity of the user from a previous search query for a same topic as the search query.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
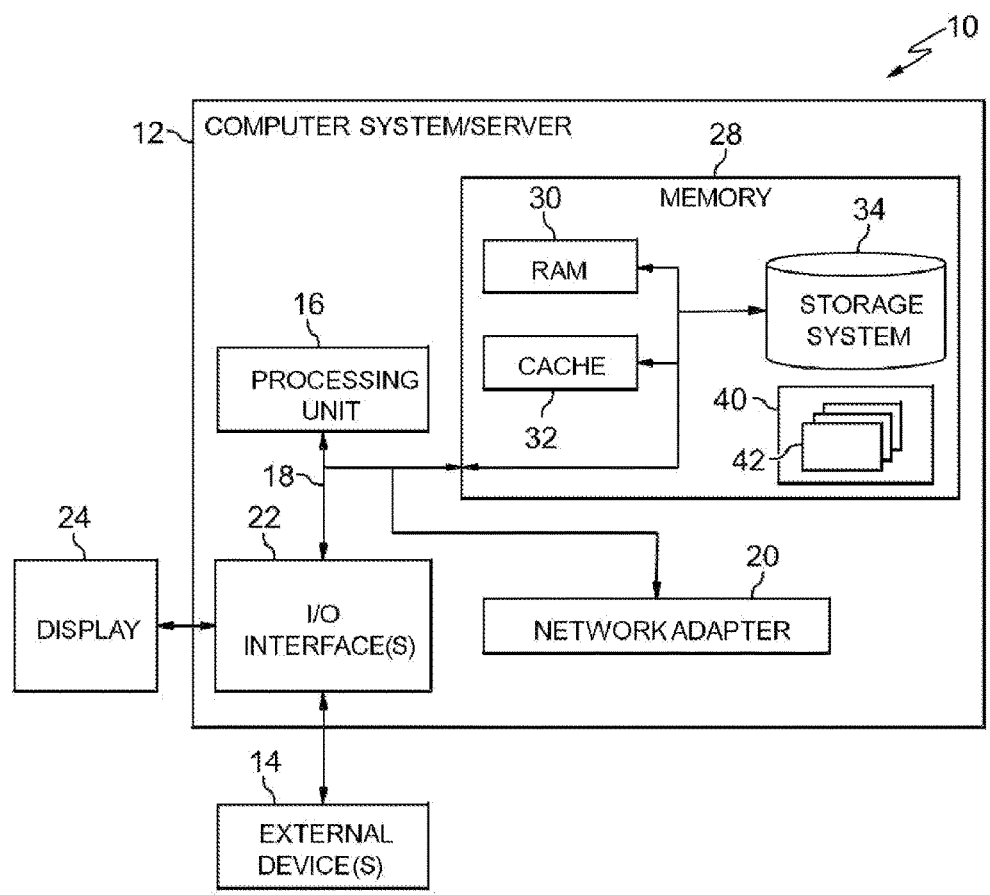
FIG. 1 depicts a computing infrastructure according to an embodiment of the present invention.

The present invention relates generally to computer-based searching and, more particularly, to methods and systems for ordering search results based on a knowledge level of a user performing the search. Implementations of the present invention can be used when making recommendations to a user, e.g., in response to a user initiated information request such as a web search (e.g., Internet search). In embodiments, the user's actions are monitored and analyzed to determine a knowledge level of the user in a particular search topic. The actions may include reading web pages during previous searches, in particular previous searches of the same search topic. The determined knowledge level may be used to adjust the rank of search results that are below the determined knowledge level. In this manner, search results that are below the knowledge level of the user, and thus potentially of less interest to the user, may be presented lower in a ranked list of search results. Search results that are at or above the knowledge level of the user, and thus potentially of more interest to the user, may be presented higher in the same ranked list of search results.

Aspects of the invention are described herein with respect to web searches (e.g., Internet searches). However, implementations of the invention are not limited to web searches, and instead may be used with other types of database or information retrieval search engines information, including but not limited to operating system (OS) or desktop search tools.

When performing a web search, the user's determined knowledge level can be used as a factor in ranking the search results. The determined knowledge level can change over time as the user progressively learns and builds their knowledge level. In this manner, an earlier search for a search query may return a first set of results, and a later search for the same search query may return a second set of results ranked differently than the first set due to the user's knowledge level having changed in the time between the earlier search and the later search.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
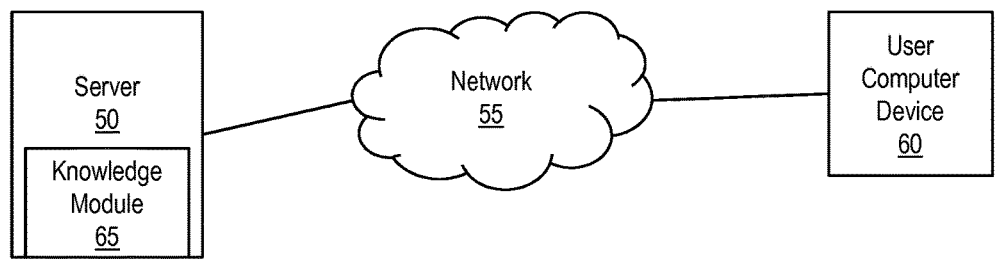
FIG. 2 shows an exemplary environment in accordance with aspects of the invention.

FIG. 2 shows an exemplary environment in accordance with aspects of the invention. The environment includes a server 50 (e.g., a web server) connected to a network 55. The server 50 may comprise a computer system 12 of FIG. 1, and may be connected to the network 55 via the network adapter 20 of FIG. 1. The server 50 may be configured as a special purpose computing device that is part of a web search engine infrastructure. For example, the server 50 may be configured to receive a search query generated by a user computer device 60, coordinate the execution of search query, and format the result of the search query into an HTML page that is returned to the user computer device 60. The execution of a search query by the server 50 may include, for example, sending queries to index servers (not shown), merging results from the index servers, computing ranks of the results, and retrieving a summary for each result from a document server (not shown).

The network 55 may be any suitable communication network or combination of networks, such as a local area network (LAN), a general wide area network (WAN), and/or a public network (e.g., the Internet). The user computer device 60 may be a general purpose computing device, such as a desktop computer, laptop computer, tablet computer, smartphone, etc. In embodiments, the user computer device 60 runs a browser application program that provides an interface (e.g., a web page) by which a user may enter (e.g., type) a search query to be submitted to the server 50. The server 50 may be configured to communicate with plural different user computer device 60 simultaneously, and perform search functions separately for each user computer device 60 independent of the others.

Still referring to FIG. 2, a knowledge module 65 of the server 50 is configured to perform one or more of the functions described herein. The knowledge module 65 may include one or more program modules (e.g., program module 42 of FIG. 1) executed by the server 50. In embodiments, the knowledge module 65 is configured to track a sequence of web pages accessed by a user as a result of a search query entered by the user at the user computer device 60. In aspects, the knowledge module 65 is configured to determine an expertise level for each web page in the sequence, determine a knowledge level of the user based on the expertise level of one or more web pages in the sequence, and rank subsequent search results based in part on the determined knowledge level of the user.

Figure 3:
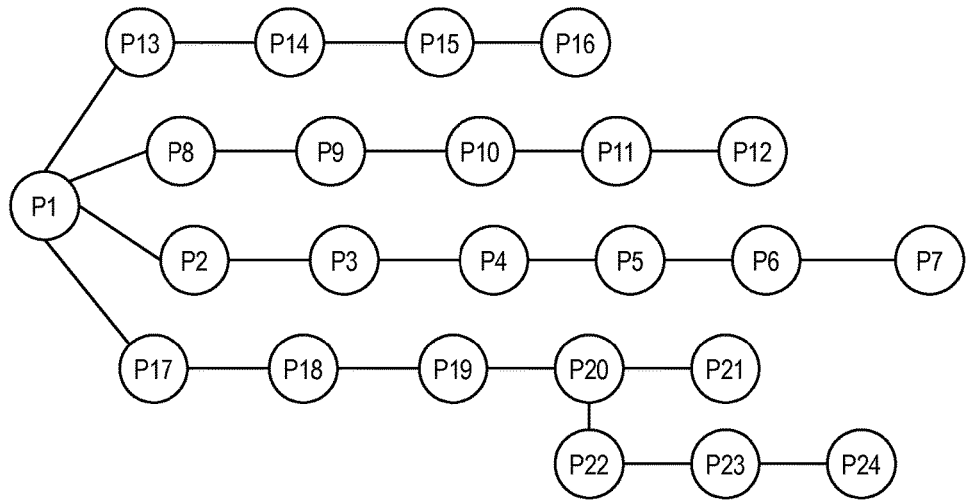
FIG. 3 shows an exemplary sequence of web pages in accordance with aspects of the invention.

FIG. 3 shows a diagram of an exemplary sequence of web pages P1-P24 accessed by a user from a search result. In the diagram, each oval represents a web page that was accessed by the user, and lines between ovals indicate the sequence in which the web pages were accessed by the user. In this example, the user entered a search query at user computer device 60 and was provided with a search result list, e.g., an HTML page presenting a ranked list of results to the search query. The web pages P1-P24 represent web pages that the user accessed (e.g., by clicking on an URL) after being presented with the search result list. For example, the user may have clicked on a URL in the search result page to access web page P1, then clicked on a hyperlink in web page P1 to access web page P2, then clicked on a hyperlink in web page P2 to access web page P3, and so on. Conventional search analytics tools (e.g., Search Engine Optimization (SEO) tools, web analytics tools, data mining, etc.) may be used to monitor and track web pages a user accesses and in what order the web pages are accessed. In this manner, the web pages P1-P24 represent a sequence of web pages that the user accessed as a result of a particular web search.

A sequence may be deemed terminated when the user enters a new search query or closes the browser. For example, web page P24 may be the last web page that the user accessed during this particular search prior to entering a new search query or closing the browser at user computer device 60. A different sequence may be generated when the same user enters a different search query, e.g., for a different topic. Moreover, different users that enter a same search query may have different sequences since the different users will most likely navigate differently through the search results. In this manner, implementations of the invention create a unique sequence for each user for each search query.

According to aspects of the invention, the knowledge module 65 determines an expertise level for each web page in the sequence. In the exemplary sequence shown in FIG. 3, the knowledge module 65 determines a respective expertise level for each web page P1-P24. For example, web pages P1, P2, P3 may be determined as having a beginner expertise level, web page P4 may be determined as having an intermediate expertise level, and web pages P5, P6, P7 may be determined as having an advanced expertise level. Aspects of the invention are described herein as web pages having one of three expertise levels: beginning, intermediate, and advanced. However, implementations of the invention are not limited to three expertise levels, and any desired number of different expertise levels may be used.

In embodiments, the expertise level for a particular web page is determined based on one of: a defined expertise level and a derived expertise level. Some web pages may have a defined expertise level. For example, a user or community of users may provide input that defines a web page as having a particular expertise level for a given topic. The defined expertise level of a web page may be stored as metadata associated with the web page, or as content in the page itself. In this situation, the knowledge module 65 determines the expertise level for the particular web page by analyzing the metadata and/or page content that defines the expertise level.

Some web pages might not have a defined expertise level. For these web pages, the knowledge module 65 may derive the expertise level for the web page by analyzing the content of the web page. For example, the knowledge module 65 may be programmed to analyze the content of a web page using natural language processing (NLP) and correlations. For example, a the knowledge module 65 may be programmed to search the text of the web page for words or phrases such as "overview" and "summary" and "getting started" and classify a web page having one or more of these phrases as a beginner expertise level. Other words and phrases may be searched to indicate an intermediate expertise level, and still other words and phrases may be searched to indicate an advanced expertise level. In some instances, the expertise level of a web page cannot be determined, in which case the system may alert the user in the search results.

In embodiments, the knowledge module 65 is also programmed to track the user's sequence of reading different web pages on a same topic and establish a relationship among the web page contents. Information defining the relationship between web pages for a particular topic may be stored as part of the metadata for the web page links. The knowledge module 65 may be programmed to use ontology (e.g., information science) techniques to identify similar topics. For example, when a user searches for "regression model" and then "association rule," the system may use ontology techniques to determine that both of these search topics are related to the topic of "data mining." In embodiments, the knowledge module 65 aggregates the data for a user and creates the sequence of different readings for the different web pages. This information may be stored as part of the metadata for each web page.

According to aspects of the invention, after determining the expertise level for the web pages in a sequence, the knowledge module 65 determines the user's knowledge level based on one or more of the determined expertise levels. In embodiments, the user's knowledge level is determined based on a combination of: the expertise level of web pages in the sequence, and a determination of which web pages of the sequence the user has read.

The determination of which web pages have been read by the user may be performed using metrics such as "dwell time" and/or "time on page" in combination with a length of each page. Dwell time and time on page may be measured for a particular web page using conventional search analytics tools. For example, the knowledge module 65 or another program module may measure the amount of time a user spends on a web page after the user clicks on the URL of that page from a search result list. The length of a web page may also be determined using conventional analytics tools. For example, the knowledge module 65 or another program module may measure a length of web page by counting the number of characters, words, sentences, and/or paragraphs contained in the web page. In embodiments, a ratio of dwell time (or time on page) to page length is determined and compared to a predefined threshold value. When the ratio is greater than the threshold value, it is inferred (e.g., determined) that the user read the web page. On the other hand, when the ratio is less than the threshold value, it is inferred (e.g., determined) that the user has not read the web page. This is because a user who has spent a small amount of time per amount of content at a web page likely has not actually read the web page.

With continued reference to the exemplary sequence shown in FIG. 3, the knowledge module 65 determines that web pages P1, P2, P3 have a beginner expertise level, web page P4 has an intermediate expertise level, and web pages P5, P6, P7 have an advanced expertise level. The knowledge module 65 also determines that the user has read web page P4 but has not read web pages P5, P6, P7. Based on these determinations of expertise levels for the web pages and which web pages the user has read, the knowledge module 65 determines that the user has a knowledge level of intermediate, e.g., corresponding to the highest expertise level of a web page that was read by the user.

Other factors may also be used in determining the user's knowledge level. For example, a user's discussions in social media may be analyzed by the knowledge module 65 (e.g., using NLP or ontology) to derive the user's knowledge level on a given topic. A knowledge level that is determined from multiple data sources (e.g., web pages read, social networking contribution, profession, etc.) is said to be identified in a multi-channel sequence chain. In embodiments, after the current knowledge level of the user is identified in multi-channel sequence chain, the knowledge module 65 will identify appropriate URL/search results from that sequence and for displaying to the user. The knowledge module 65 may additionally determine a multi-channel sequence of contents based on the sequence of reading analysis of many different users, and identify the position of a particular user in that sequence chain.

Figure 4A:
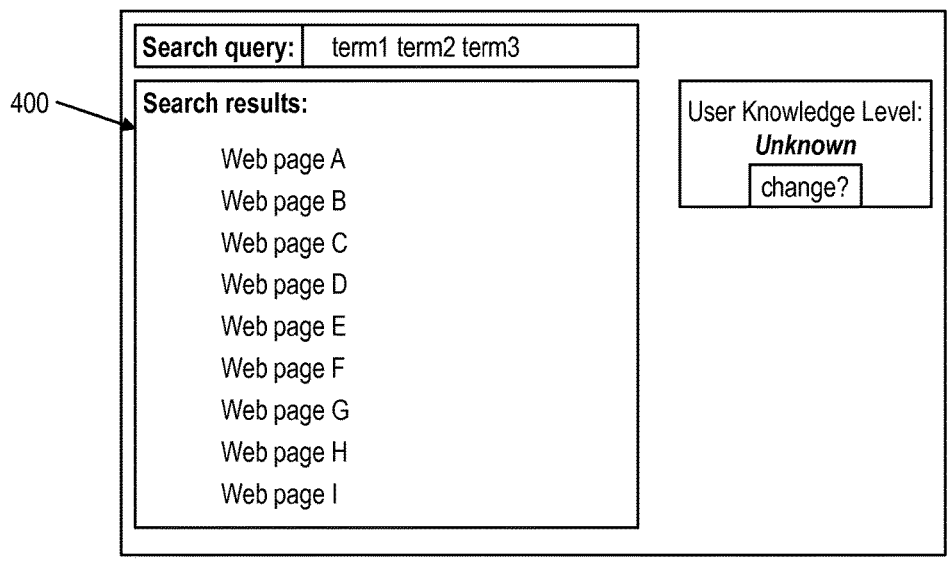
FIGS. 4A and 4B show exemplary displays of search results in accordance with aspects of the invention.
Figure 4B:
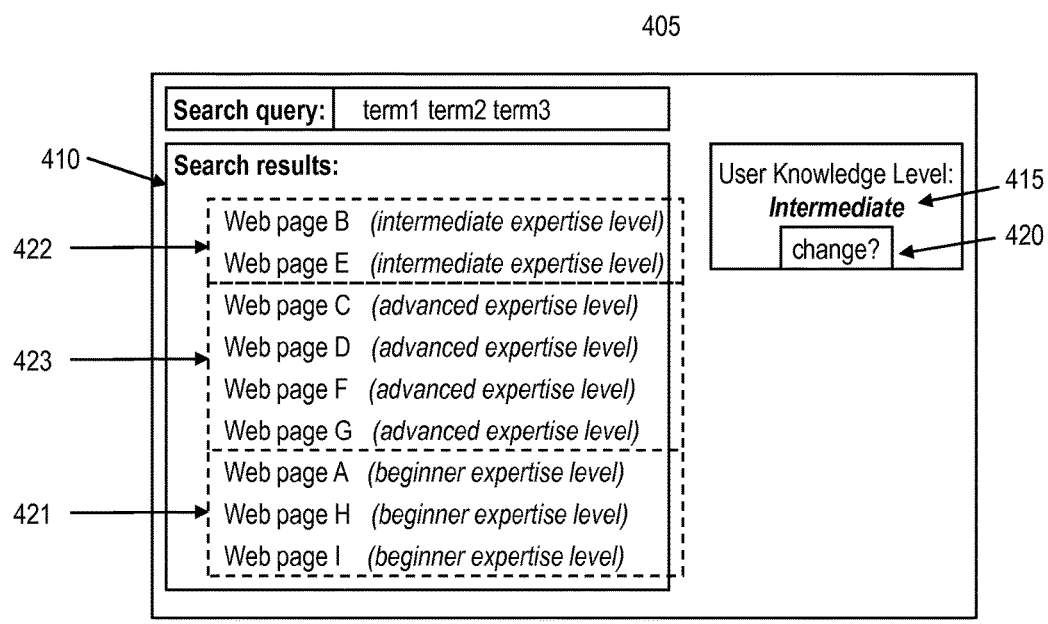

FIGS. 4A and 4B show exemplary displays of search results in accordance with aspects of the invention. In embodiments, the determined knowledge level of the user is used to adjust the ranking of search results of a search query.

FIG. 4A shows an example of a search query and search results when a user submits a search query on a topic for a first time. Since this is the first time the user has searched for this topic, the knowledge module 65 does not have any data for this user on this topic, i.e., a knowledge level for this use for this topic has not previously been determined. Accordingly, the server 50 determines the search results in a conventional manner, for example using a scoring algorithm. For example, in FIG. 4A the search results 400 are displayed as a list of web pages that are ranked according to their determined relevance, e.g., Web page A is scored most relevant, Web page B has the second highest relevance, etc. When the user accesses and reads web pages during this first search, the knowledge module 65 monitors the user's activity and determines the user's knowledge level in the manner described herein.

FIG. 4B shows an example of a search query and search results when a user submits a subsequent search query on the same topic, either by submitting the same search query at a later time or by using the back button to return to the search results page. When the user submits a subsequent search query on the same topic, the server 50 determines the search results using the same scoring algorithm but adjusts the rank of certain search results based on the determined knowledge level of the user and the determined expertise level of the web pages in the search results. For example, web pages in the search results that have an expertise level (e.g., beginner) that is lower than the knowledge level of the user (e.g., intermediate) may be demoted in the ranked list of search results, e.g., their score may be decreased relative to other pages that have an expertise level that is at or higher than the knowledge level of the user.

As shown in FIG. 4B, Web page A has been identified as a web page having a beginner expertise level, and the user knowledge level has been determined as intermediate. Accordingly, Web page A has been demoted in the list of ranked search results 410, even though Web page A was deemed the most relevant when the user's knowledge level is not taken into account (e.g., as in FIG. 4A).

In embodiments, the server 50 is configured to cause the search result page to display the determined expertise level of each web page in the search result list, e.g., as at reference number 405. The determined expertise level may be displayed in any desired manner, such as using text, symbols, or colors (background and/or text) to visually indicate the determined expertise level of each web page in the search result list.

As shown in FIG. 4B, the server 50 may be configured to cause the search result page to display the determined knowledge level of the user, e.g., at reference number 415. The system may be configured such that the user can provide input to change their knowledge level, e.g., at input object 420. For example, a user having a determined knowledge level of intermediate may feel that the search results are below their actual knowledge level, and this user may provide input at the search result page to manually change their knowledge level to advanced. Based on this manual change, the knowledge module 65 will re-rank the search results using the user-specified knowledge level.

Still referring to FIG. 4B, search results may be grouped according to the determined expertise level of the web pages. For example, the beginner expertise level web pages may be shown in a first group 421, the intermediate expertise level web pages may be shown together in a second group 422, and the advanced expertise level web pages may be shown together in a third group 423. The groups 421, 422, 423 may be arranged relative to one another in the search result list based on the knowledge level of the user. For example, when a user has a determined knowledge level of intermediate, the group beginner expertise level web pages (group 421) may be displayed at the bottom of the list, below the other groups 422, 423. The different groups may be displayed in a manner that visually indicates the differences between the groups. The web pages within each group may be listed in ranked order of relevance compared to other web pages in the same group. For example, Web page B and Web page E are displayed together in group 422 because they are both determined to have an intermediate expertise level. Within group 422, Web page B is listed higher than Web page E because Web page B has a higher relevance score, e.g., determined using the scoring algorithm.

Each time the user accesses and reads more web pages on the same topic, the knowledge module 65 continues to monitor the activity and refine the user's knowledge level. Higher levels of granularity of web pages expertise level and user knowledge level may be used. For example, instead of three levels (e.g., beginner, intermediate, and advanced), there may be ten levels (e.g., levels correspond to numbers between 1 and 10) or any other desired scheme. By using greater numbers of determined levels for web page expertise level and user knowledge level, a more fine-tuned search may be achieved.

As described herein, the user's knowledge level is determined for a particular search topic. When a user performs a subsequent search for a same topic, the determined knowledge level for that topic is utilized in adjusting the ranks of the search results. When the user searches for a different topic, a different knowledge level may be determined and utilized in adjusting the ranks of the search results. As used herein, searches of a same topic may be defined as searches that have the exact same text in the search query. Searches may also be determined as being to the same topic when the different search queries are not exact matches. For example, two search queries may be compared to one another to determine a percentage of similar words in the queries. When the percentage of similar words in two queries is greater than a predefined threshold, those two searches may be deemed as being directed to the same topic. Other measures of similarity may be used to determine whether two searches are directed to a same topic, such as ontology.

Figure 5:
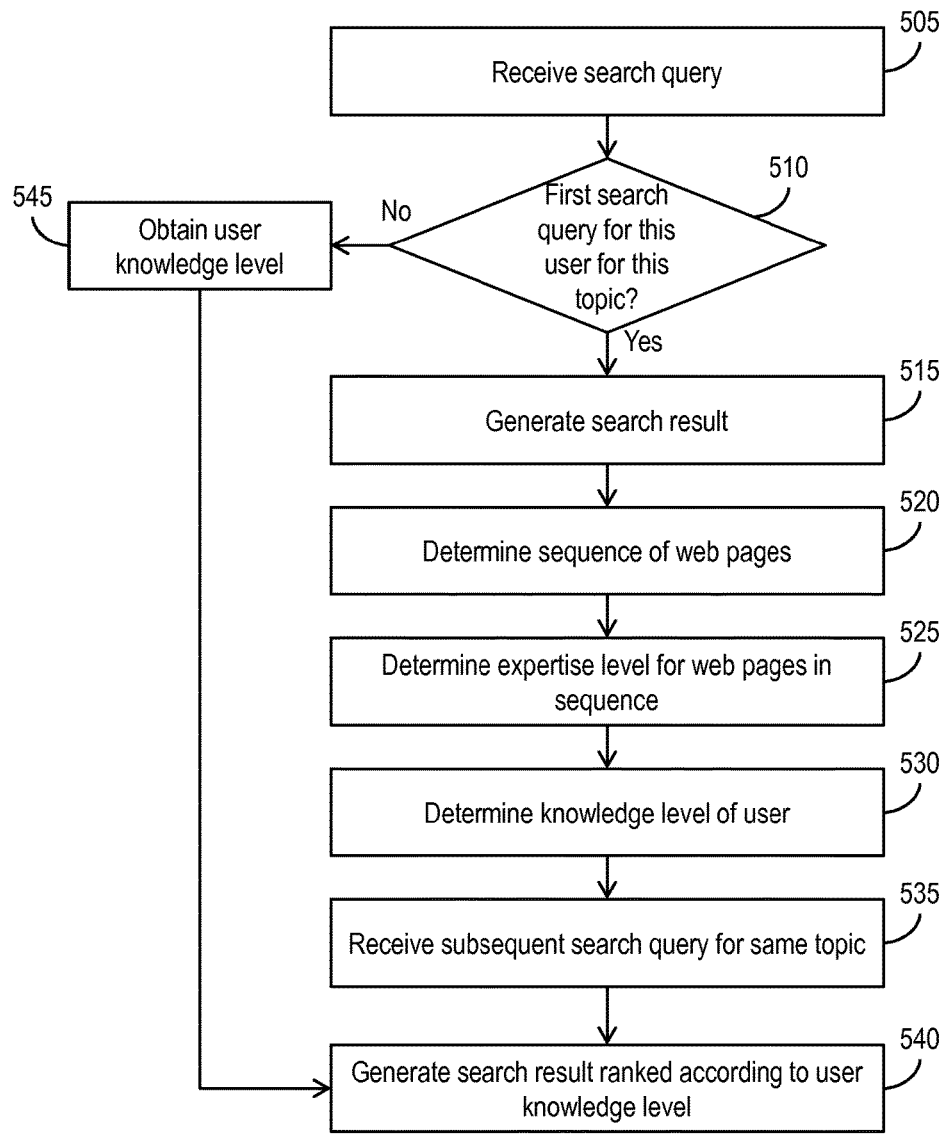
FIG. 5 shows a flowchart of steps of a method in accordance with aspects of the invention.

FIG. 5 shows a flowchart of a method in accordance with aspects of the invention. Steps of the method of FIG. 5 may be performed in the environment illustrated in FIG. 2, and are described with reference to elements shown in FIG. 2.

At step 505, the system (e.g., server 50 executing knowledge module 65) receives a search query from a user computer device (e.g., user computer device 60).

At step 510, the system determines whether this is a first time the user has searched for this topic, i.e., the topic of the search query from step 505. For example, the system may analyze stored data to determine whether there is an already determined knowledge level for this user for this topic.

In the event this is the first search for this user for this topic, then at step 515 the system generates a search result in a conventional manner, e.g., using a scoring algorithm. Step 515 may also include the system transmitting the search result (e.g., an HTML page containing the search result in a ranked order according to relevance to the search query) to the user computer device for display on thereon (e.g., as shown in FIG. 4A).

At step 520, the system determines a sequence of web pages associated with the search results. Step 520 may be performed in the manner described with respect to FIGS. 2 and 3. In embodiments, the system may monitors and tracks the user activity associated with the search results. For example, the system may monitor and identify web pages that the user accessed from the search result, and a sequence in which the user accessed the web pages.

At step 525, the system determines an expertise level for each web page in the sequence that was determined at step 520. The expertise level may be determined in the manner described with respect to FIGS. 2 and 3, e.g., by using defined or derived expertise levels.

At step 530, the system determines a knowledge level for the user for this search topic. The knowledge level may be determined in the manner described with respect to FIGS. 2 and 3. For example, the system may determine which web pages of the sequence were read by the user, e.g., based on dwell time (or time on page), web page length, and a threshold. The system may determine the user's knowledge level based on the highest expertise level web page read by the user.

At step 535, the system receives a search query from a user computer device for the same search topic. The search query at step 535 may be an instance where the user starts anew at the search page and enters the same search query again (e.g., at a time after step 505). Alternatively, the search query at step 535 may be an instance where the user employs the back button to return to the search results page, such that the search query from step 505 is still populated in the search field at the search page.

At step 540 the system generates a search result based on the search query and the determined knowledge level of the user for the topic of the search query. Step 540 may be performed in the manner described herein. For example, the system may initially generate a search result using the search query and the scoring algorithm. In embodiments, the system determines an expertise level of each web page in the search result (either from metadata of the web page or anew), and adjusts the ranking of at least one web page in the search result based on the expertise level of the at least one web page and the determined knowledge level of the user. Step 640 may include the system transmitting the search result to the user computer device for display on thereon, as shown for example in FIG. 4B.

Referring back to step 510, when the system determines that the search query at step 505 is not a first time the user has searched this topic, then the process proceeds to step 545 where the system determines the user knowledge level for this topic. In embodiments, previously determined user knowledge levels for topics are stored in memory that is accessible by the system, and step 545 may include obtaining the previously determined user knowledge levels for the topic associated with the search query from step 505. The process then proceeds to step 540, where the search result is determined based on the search query and the determined knowledge level (from step 545).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for ranking search results according to a knowledge level of a user, on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computing device, an initial search query for a topic from a remote user computer device in a network environment;
   generating, by the computing device, search results for the initial search query;
   determining, by the computing device, read web pages in a sequence of web pages accessed by a user of the remote user computer device by;

determining a dwell time for each page in the sequence of web pages;

determining a page length of each page in the sequence of web pages;

determining a ratio of the dwell time to the page length for each page in the sequence of web pages; comparing the ratio, for each page in the sequence of web pages, to a threshold value;

determining the user read a particular web page when the ratio is greater than the threshold value; and determining the user did not read the particular web page when the ratio is less than the threshold value;

determining, by the computing device, a respective expertise level of each of a plurality of read web pages in the sequence of web pages;

determining, by the computing device, a knowledge level of the user, wherein the determining the knowledge level of the user consists of determining a highest expertise level of the respective expertise levels of each of the plurality of read web pages in the sequence of web pages, and basing the knowledge level of the user on the highest expertise level of the respective expertise levels, wherein the total number of read web pages is less than the total number of web pages in the sequence of web pages;

receiving, by the computing device, a subsequent search query from the user via the remote user computer device;

determining, by the computing device, a plurality of subsequent results based on the subsequent search query;

determining, by the computing device, a respective expertise level for each of the plurality of subsequent results;

ranking, by the computing device, the plurality of subsequent results based on the knowledge level of the user and the respective expertise level for each of the plurality of subsequent results; and outputting, by the computing device, the ranked plurality of subsequent results to the remote user computer device.

2. The method of claim 1, wherein the determining the respective expertise level for each of the plurality of results comprises one one of: determining a defined expertise level of a web page; and deriving an expertise level of the web page by analyzing content of the web page using natural language processing.

3. The method of claim 1, further comprising: monitoring activity of the user with the ranked plurality of results; and adjusting the knowledge level of the user based on the monitoring.

4. The method of claim 1, further comprising outputting, by the computing device, the knowledge level of the user to the remote user computer device for display on the user computer device.

5. The method of claim 4, further comprising: receiving, by the computing device, input from the user to change the knowledge level of the user; re-ranking, by the computing device, the plurality of results based on the changed knowledge level of the user and the respective expertise level for each of the plurality of results; and outputting, by the computing device, the re-ranked plurality of results to the remote user computer device.

6. The method of claim 1, wherein a service provider at least one of creates, maintains, deploys and supports the computing device.

7. The method of claim 1, wherein steps of claim 1 are provided by a service provider on a subscription, advertising, and/or fee basis.

8. The method of claim 1, further comprising: tracking the user's sequence of reading read web pages in the sequence of web pages accessed by the user during a previous search query to establish relationship data; and storing the relationship data as metadata for web page links.

9. The method of claim 1, wherein the read web pages have an expertise level selected from the group consisting of: beginner, intermediate and advanced.

10. The method of claim 9, wherein: at least one web page accessed by the user but not read, has an advanced expertise level, the highest expertise level of each read web page is intermediate, and the knowledge level of the user is determined based on only the intermediate expertise level.

11. A computer program product comprising a computer readable storage medium having program instructions embodied therewith, the program instructions executable by a computing device to cause the computing device to:

receive an initial search query for a topic from a user via a remote user computer device in a network environment;

generate search results for the initial search query;

determine read web pages in a sequence of web pages accessed by the user of the remote user computer device by:
  determining a dwell time of a user for each web page in the sequence of web pages;
  determining a page length of each web page in the sequence of web pages;
  determining a ratio of the dwell time to the page length for each web page in the sequence of web pages;
  comparing the ratio, for each web page in the sequence of web pages, to a threshold value;
  determining that the user has read a first subset of the sequence of web pages when the ratio is greater than the threshold value; and
  determining that the user did not read a second subset of the sequence of web pages when the ratio is less than the threshold value;

determine a respective expertise level of each of the first subset of the sequence of web pages based on determining that the user has read the first subset of the sequence of web pages;

determine a knowledge level of a user, wherein the determining the knowledge level of the user consists of determining a highest expertise level of the respective expertise levels of each of the first subset of the sequence of web pages, and basing the knowledge level of the user on the highest expertise level of the respective expertise levels, wherein the expertise level of the second subset is not utilized in the determination of the knowledge level of the user;

receive a subsequent search query from the user via the remote user computer device;

determine a plurality of subsequent results based on the subsequent search query;

determine a respective expertise level for each of the plurality of subsequent results;

rank the plurality of subsequent results based on the knowledge level of the user and the respective expertise level for each of the subsequent results; and output the ranked plurality of subsequent results to the remote user computer device.

12. The computer program product of claim 11, wherein the outputting comprises outputting the respective expertise level for each of the plurality of web pages and the knowledge level of the user to the remote user computer device for display on the remote user computer device.

13. The computer program product of claim 11, wherein the program instructions executable by the computing device further cause the computing device to: track the user's sequence of reading read web pages in the sequence of web pages accessed by the user during a previous search query to establish relationship data; and store the relationship data as metadata for web page links.

14. A system comprising:
a CPU, a computer readable memory and a computer readable storage medium associated with a computing device;
program instructions to receive an initial search query from a user via a remote user computer device in a network environment;
program instructions to generate search results for the initial search query;
program instructions to determine read web pages in a sequence of web pages accessed by the user of the remote user computer device by;
 determining a dwell time for each page in the sequence of web pages;
 determining a page length of each page in the sequence of web pages;
 determining a ratio of the dwell time to the page length for each page in the sequence of web pages;
 comparing the ratio, for each page in the sequence of web pages, to a threshold value;
 determining the user read a particular web page when the ratio is greater than the threshold value; and
 determining the user did not read the particular web page when the ratio is less than the threshold value;
program instructions to determine a respective expertise level for each of the plurality of web pages;
program instructions to determine a knowledge level of the user, wherein the determining the knowledge level of the user consists of determining a highest expertise level of the respective expertise levels of each of the plurality of read web pages in the sequence of web pages, and basing the knowledge level of the user on the highest expertise level of the respective expertise levels, wherein the total number of read web pages is less than the total number of web pages in the sequence of web pages:
program instructions to receive a subsequent search query from the user via the remote user computer device;
program instructions to determine a plurality of subsequent results based on the subsequent search query;
program instructions to determine a respective expertise level for each of the plurality of subsequent results;
program instructions to rank the plurality of subsequent results based on the knowledge level of the user and the respective expertise level for each of the plurality of subsequent results; and
program instructions to output the ranked plurality of subsequent results to the remote user computer device;
wherein the program instructions are stored on the computer readable storage medium for execution by the CPU via the computer readable memory.

15. A system of claim 14, further comprising: program instructions to track the user's sequence of reading read web pages in the sequence of web pages to establish relationship data; and program instructions to store the relationship data as metadata for web page links.

16. The system of claim 14, wherein the read web pages have an expertise level selected from the group consisting of: beginner, intermediate and advanced.

17. The system of claim 16, wherein: at least one web page accessed by the user but not read, has an advanced expertise level, the highest expertise level of each read web page is intermediate, and the knowledge level of the user is determined based on only the intermediate expertise level.

* * * * *